Registered Jan. 31, 1939

Re. 20,994

UNITED STATES PATENT OFFICE 20,994

METHOD OF TREATING RAW PHOSPHATE

Markus Larsson, Berlin, Germany, assignor to Kunstdunger-Patent - Verwertungs - Aktiengesellschaft, Glarus, Switzerland No Drawing. Original No. 1,902,648, dated March 21, 1933, Serial No. 366,078, May 25, 1929. Application for reissue December 18, 1934, Serial No. 758,092. In Sweden June 5, 1928

8 Claims. (Cl. 23—165)

When raw phosphate is treated with sulphuric acid or acid solutions containing alkali sulphates to produce phosphoric acid or soluble phosphates, the lime of the raw phosphate is converted into insoluble calcium sulphate while the phosphoric acid is dissolved. In such processes it has proved difficult to obtain a quantitative output, chiefly because the calcium sulphate settles as a tight coating on the larger grains of the raw phosphate and thus prevents the solvent liquor from dissolving them completely. In order to obtain a good output it has, therefore, proved necessary in such operations to work with a very finely ground and classified raw phosphate. Another circumstance which also causes a reduction of the output consists in that in so treating certain raw phosphates, particularly raw phosphates having a high percentage of carbonate, the calcium sulphate is precipitated in such a crystal form that it is very difficult to separate it from the solution formed and for this reason it has been necessary, for instance in producing phosphoric acid, to work only with special kinds of raw phosphates and to use a comparatively diluted acid for the treatment.

The object of this invention is to remove the said inconveniences and to render a very good result possible without any special fine grinding of the raw phosphate being necessary, and besides all kinds of raw phosphates can be used in the process and comparatively strong solutions may be produced directly.

The method is characterized in that the calcium sulphate is precipitated either directly as semi-hydrate, sometimes called hemihydrate $$(2CaSO_4.H_2O)$$

or is converted into semihydrate in a suitable manner after the precipitation, whereupon said semi-hydrate is caused to recrystallize into gypsum ($CaSO_4.2H_2O$) which is then in a known or suitable manner separated from the solution. The semihydrate of calcium sulphate is obtained either directly by the raw phosphate being treated at a high temperature (usually more than 90° C.) and with a rather highly concentrated solution, or by the raw phosphate being first treated at a lower temperature with a rather strong solution, so as first to precipitate the calcium sulphate as gypsum, and then the temperature of the solution being raised. When this liquor together with the semi-hydrate of calcium sulphate present therein is subsequently cooled or diluted the semi-hydrate re-crystallizes into gypsum, the incompletely dissolved grains of raw phosphate which were covered by crystals of semi-hydrate being then freed and subjected to a new attack from the solvent liquor, sometimes called menstruum, and are thus practically completely dissolved. To facilitate the re-crystallization, gypsum crystals may, preferably, be added to the liquor in the cooling or dilution, the calcium sulphate being then precipitated, chiefly, on the said crystals according as the semi-hydrate is dissolved. By varying the size and the quantity of the gypsum crystals added, the final gypsum crystals can be produced with practically any desired size. It is important that the crystals added are short and compact as a gypsum then is obtained in the re-crystallization which may easily and effectively be separated from the solution, because when filtered it delivers a very compact filter cake easy to wash out or when decanted settles rapidly to a comparatively small volume of slime.

In order to produce gypsum crystals which are suitable as addition in the re-crystallization of the calcium sulphate from semi-hydrate into gypsum, sometimes called hydration, and simultaneously to obtain the gypsum leaving the system in the shape of crystals of the size desired the process is, preferably, carried out in the following manner. The phosphorous acid liquor together with gypsum crystals of different sizes suspended therein are transferred, after the finishing of their re-crystallization, which is, preferably, carried out in a vessel separate from the reaction vessel, into an apparatus, as for instance a classifier of a known type, in which the larger crystals are separated from the main portion of the solution, which still contains the smaller crystals in suspension. The large crystals separated may subsequently be filtered out and washed on a filter or be treated in any other known manner for the recovery of adherent phosphatic solution, whereupon the washing liquid is, preferably, transferred to the reaction vessel. The solution, freed from the large gypsum crystals, together with the smaller gypsum crystals suspended therein is, preferably, transferred into a decantation tank, in which the gypsum is permitted to settle so that the solution can be decanted. The bottom slime, consisting of the smaller gypsum crystals together with a small quantity of solution, is then brought back to the re-crystallization vessel, in which the small crystals have opportunity to increase and thus to obtain the desired size. Generally small gypsum crystals as well as large ones are obtained in this manner so that the process may be carried on continuously.

*Example 1.*—340 grams of 78% sulphuric acid were diluted with 309 grams of a phosphoric acid solution containing 15.5% $H_3PO_4$ and were heated to a temperature between 90° C. and the boiling-point of the solution. 300 grams of pulverized raw phosphate were stirred into 309 grams of phosphoric acid of the same strength and then the mixture was added in small portions to the hot sulphuric acid solution. After about 1 hour's reaction a mixture of 100 cubic centimetres of phosphoric acid solution from a previous experiment, which contained 30% $H_3PO_4$ and about 40 grams of gypsum, and 309 grams of diluted phosphoric acid, containing 15.5% $H_3PO_4$, were added. The temperature sank by this addition from about 100° C. to 80° C. and was then maintained at 70–80° C. for 4 to 5 hours under agitation until the re-crystallization had finished. During the later part of the re-crystallization gas was evolved causing a foaming which clearly proved that grains of raw phosphate had been freed in the re-crystallization and thus again could be attacked by the acid liquor. Before the re-crystallization the liquor was very viscous and thickly fluid but afterwards it was thin and comparatively easily fluid. The recrystallized gypsum settled with a speed of about 40 centimetres an hour and left 55 to 60% of the entire volume as a clear solution. The quantity of 927 grams of diluted phosphoric acid, containing 15.5% $H_3PO_4$, used in the experiment corresponds to the washing liquid which is obtained in an effective washing of the quantity of gypsum corresponding to the raw phosphate.

*Example 2.*—600 grams of a solution containing 150 grams of ammonium sulphate, 63 grams of ammonium nitrate, 15 grams of ammonium phosphate and 7 grams of phosphoric acid, said solution corresponding as to its composition to the composition of the washing liquid which is obtained in an effective washing of the precipitated calcium sulphate mud with ammonium sulphate solution, were heated to a temperature between 90° and the boiling point of the solution, whereupon 150 grams of dry raw phosphate were added under agitation and then 230 grams of 50% nitric acid were added in small portions. The treatment was continued at the above-mentioned temperature, whereupon the solution was cooled to 60 to 70° and simultaneously 75 cubic centimetres of a solution containing about 20 grams of gypsum from a previous similar experiment were added. After 5 to 6 hours' agitation at the above-mentioned temperature the re-crystallization was finished. The re-crystallized gypsum settled with a speed of about 50 centimetres an hour and left about 75% of the solution as a clear liquid. Also in this case generation of gas with foaming set in during the later part of the re-crystallization.

What I claim is:

1. A method of treating phosphate rock, which comprises reacting upon the phosphate rock with chemical reagents under such condition of concentration that a solution containing an essential part of the phosphoric acid and a precipitate of calcium sulphate are produced, subjecting the reaction mixture to a temperature of at least 80° C., thus bringing the calcium sulphate to crystallize substantially as semihydrate in the solution, then causing the semihydrate to recrystallize into dihydrate by lowering the temperature of the solution, and finally separating said dihydrate from the solution produced.

2. A method of treating phosphate rock, which comprises decomposing the phosphate rock with an acid solution containing $SO_4$-ions, the strength and quantity of the acid solution being so related to the phosphate rock that an essential part of the phosphoric acid is dissolved and the lime content of the phosphate rock is substantially converted into calcium sulphate held in suspension in the solution produced, raising the temperature during the process to at least 80° C., thus bringing the calcium sulphate to crystallize with at most ½ molecule of crystal water, then causing said crystallized calcium sulphate to recrystallize into dihydrate by lowering the temperature of the solution, and finally separating said dehydrate from the solution.

3. A process of leaching phosphate rock, which comprises dissolving the phosphate rock in a mineral acid capable of liberating the phosphoric acid and bringing the lime in solution, adding alkali sulphate in sufficient quantity to precipitate the lime dissolved as calcium sulphate and to produce a suspension of the latter in the phosphoric acid solution, raising the temperature during the process to at least 80° C., thus bringing the calcium sulphate to crystallize substantially as semihydrate, then causing said semihydrate to recrystallize in the solution by lowering the temperature below 80° C., and finally separating said dihydrate from the solution produced.

4. A method of treating phosphate rock, which comprises decomposing the phosphate rock with chemical reagents under such condition of concentration that a solution containing an essential part of the phosphoric acid and a precipitate of calcium sulphate are produced, raising the temperature during the process to at least 80° C., thus bringing the calcium sulphate to crystallize substantially as semihydrate in the solution, then causing said semihydrate to recrystallize into dihydrate by diluting the solution and simultaneously lowering its temperature below 80° C., and finally separating said dihydrate from the solution produced.

5. A method of treating phosphate rock, which comprising treating the phosphate rock with an acid solution containing alkali and $SO_4$-ions so as to produce a suspension of calcium sulphate in phosphoric acid solution, subjecting the reaction products to a temperature of at least 80° under such condition of concentration that the calcium sulphate crystallizes with at most ½ molecule of crystal water, then causing the calcium sulphate to recrystallize into dihydrate in the solution by lowering the temperature below 80° C., and finally separating said dihydrate from the solution.

6. A method of treating phosphate rock, which comprises reacting upon the phosphate rock with chemical reagents under such condition of concentration that a solution containing the main part of the phosphoric acid of the phosphate rock and a precipitate of calcium sulphate enclosing undissolved rock particles are produced, raising the temperature during the process to at least 80° C., thus bringing the calcium sulphate to crystallize substantially as semihydrate, then causing the semihydrate to recrystallize into dihydrate by lowering the temperature of the solution while setting free the enclosed rock particles, dissolving the latter in the acid solution, and finally separating the solution from the insoluble matters.

7. A method of treating phosphate rock, which comprises treating the phosphate rock with an acid solution containing alkali and $SO_4$-ions until the main part of the phosphoric acid is dissolved and the lime content of the phosphate rock is substantially converted into calcium sulphate enclosing undissolved particles of phosphate rock, subjecting the reaction products to a temperature of at least 80° C. under such condition of concentration that the calcium sulphate crystallizes with at most ½ molecule of crystal water, then causing the calcium sulphate to recrystallize into dihydrate in the solution by lowering the temperature below 80° C., dissolving the rock particles set free by said recrystallization process, and finally separating the solution from the insoluble matters.

8. A cyclic method of producing gypsum from phosphate rock which comprises continuously reacting such rock in a chemical reagent under conditions to yield precipitated calcium sulphate semi-hydrate in a phosphoric-acid menstruum, continuously passing such semi-hydrate in its menstruum to a hydrating and recrystallizing stage, continuously converting in that stage semi-hydrate into gypsum, continuously subjecting a quantity of the content of the recrystallizing stage to selective-size classification, continuously removing larger gypsum crystals from said size classification, continuously sedimenting suspended classified smaller crystals to yield settled slime and decanted solution, and continuously returning such settled slime to the recrystallizing stage.

MARKUS LARSSON.